United States Patent
Lovelock et al.

(10) Patent No.: US 11,456,876 B2
(45) Date of Patent: Sep. 27, 2022

(54) VIRTUAL CREDENTIALS AND LICENSES

(71) Applicant: ASSA ABLOY AB, Stockholm (SE)

(72) Inventors: Julian Eric Lovelock, Pleasanton, CA (US); Philip Hoyer, Richmond (GB)

(73) Assignee: ASSA ABLOY AB, Stockholm (SE)

(*) Notice: Subject to any disclaimer, the term of this patent is extended or adjusted under 35 U.S.C. 154(b) by 407 days.

(21) Appl. No.: 15/259,372

(22) Filed: Sep. 8, 2016

(65) Prior Publication Data

US 2016/0380774 A1    Dec. 29, 2016

Related U.S. Application Data

(63) Continuation-in-part of application No. PCT/IB2016/000883, filed on Mar. 25, 2016.

(Continued)

(51) Int. Cl.
*H04L 9/32* (2006.01)
*H04L 9/30* (2006.01)
(Continued)

(52) U.S. Cl.
CPC ......... *H04L 9/3247* (2013.01); *G06Q 50/265* (2013.01); *H04L 9/14* (2013.01); *H04L 9/30* (2013.01)

(58) Field of Classification Search
CPC . H04L 9/3247; H04L 9/14; H04L 9/30; H04L 9/32; H04L 63/06; H04L 63/0869;
(Continued)

(56) References Cited

U.S. PATENT DOCUMENTS 7,177,839 B1 * 2/2007 Claxton ................. G06Q 20/12
    705/44
7,457,950 B1 * 11/2008 Brickell ................. G06F 21/33
    705/317

(Continued)

FOREIGN PATENT DOCUMENTS

EP    3142064 A1    3/2017
EP    3353736 A1    8/2018
(Continued)

OTHER PUBLICATIONS

Herzberg et al., Relying Party Credentials Framework, Google Online (Year: 2007).*

(Continued)

*Primary Examiner* — Kambiz Zand
*Assistant Examiner* — Mahabub S Ahmed
(74) *Attorney, Agent, or Firm* — Schwegman Lundberg & Woessner, P.A.

(57) ABSTRACT

Providing virtualized credentials of a holder includes authorizing a subset of credential data to be sent to a device of a relying party that is different from the holder, where the subset of credential data depends on a role of the relying party, selection by the holder, and/or contextual data of the relying party and includes displaying the subset of credential data on a screen of the device of the relying party. The contextual data may be a privacy level setting, distance between the relying party and the holder, and/or geolocation of the relying party. The role of the relying party may be provided by the relying party. Role information provided by the relying party may be provided in a verifiable format. The role information may be digitally signed or securely derived and determined by a mutual authentication algorithm between the relying party and the holder.

28 Claims, 7 Drawing Sheets

Related U.S. Application Data (60) Provisional application No. 62/232,785, filed on Sep. 25, 2015, provisional application No. 62/216,039, filed on Sep. 9, 2015, provisional application No. 62/138,555, filed on Mar. 26, 2015.

(51) Int. Cl.
*H04L 9/14* (2006.01)
*G06Q 50/26* (2012.01)

(58) Field of Classification Search
CPC ...... H04L 63/08; H04W 12/04; H04W 12/06; G06Q 50/265; G06Q 30/018
USPC .................. 713/169; 705/44, 317; 726/9
See application file for complete search history.

(56) References Cited

U.S. PATENT DOCUMENTS

| | | | | |
|---|---|---|---|---|
| 8,316,237 B1* | 11/2012 | Felsher | H04L 9/0825 | 380/282 |
| 8,584,224 B1* | 11/2013 | Pei | H04L 9/3213 | 713/168 |
| 8,843,997 B1* | 9/2014 | Hare | H04L 63/0281 | 709/200 |
| 8,863,308 B2* | 10/2014 | Boysen | H04L 63/0492 | 713/169 |
| 8,893,293 B1* | 11/2014 | Schmoyer | H04L 63/0807 | 726/4 |
| 9,043,886 B2* | 5/2015 | Srinivasan | H04L 63/0815 | 726/9 |
| 9,160,727 B1* | 10/2015 | Saylor | H04W 4/023 | |
| 9,397,838 B1* | 7/2016 | Chen | H04W 12/06 | |
| 9,646,150 B2* | 5/2017 | Toth | G06F 21/45 | |
| 9,721,147 B1* | 8/2017 | Kapczynski | G06Q 50/265 | |
| 10,572,874 B1* | 2/2020 | Shahidzadeh | H04W 12/68 | |
| 2003/0115142 A1* | 6/2003 | Brickell | G07C 9/22 | 705/51 |
| 2004/0039919 A1* | 2/2004 | Takayama | G06Q 20/04 | 713/180 |
| 2005/0223217 A1* | 10/2005 | Howard | G06F 21/31 | 713/155 |
| 2006/0200671 A1* | 9/2006 | Ishigaki | G06Q 30/02 | 713/176 |
| 2007/0016943 A1* | 1/2007 | M'Raihi | G06F 21/33 | 726/9 |
| 2007/0058803 A1* | 3/2007 | Suga | H04L 63/0442 | 380/30 |
| 2007/0074037 A1* | 3/2007 | Eckleder | G06F 21/6209 | 713/180 |
| 2007/0250704 A1* | 10/2007 | Hallam-Baker | H04L 9/3271 | 713/156 |
| 2007/0250904 A1* | 10/2007 | Waller | G06F 21/6245 | 726/1 |
| 2007/0277035 A1* | 11/2007 | Patel | H04L 9/0822 | 713/168 |
| 2007/0288750 A1* | 12/2007 | Camenisch | G06Q 20/3821 | 713/168 |
| 2008/0010287 A1* | 1/2008 | Hinton | H04L 29/12594 | |
| 2008/0167888 A1* | 7/2008 | Keithley | G06Q 20/04 | 713/156 |
| 2008/0222714 A1* | 9/2008 | Wahl | H04L 63/08 | 726/9 |
| 2008/0289019 A1* | 11/2008 | Lam | G06F 21/41 | 726/9 |
| 2008/0289020 A1* | 11/2008 | Cameron | H04L 9/3247 | 726/9 |
| 2008/0307500 A1* | 12/2008 | Garnier De Falletans | H04L 63/0853 | 726/3 |
| 2009/0013391 A1* | 1/2009 | Ernst | H04L 9/3271 | 726/6 |
| 2009/0119757 A1* | 5/2009 | Acuna | G06F 21/6245 | 726/5 |
| 2009/0132813 A1* | 5/2009 | Schibuk | G06Q 20/40 | 726/9 |
| 2009/0217385 A1* | 8/2009 | Teow | G06F 21/604 | 726/27 |
| 2009/0222653 A1* | 9/2009 | Findeisen | G06F 21/575 | 713/2 |
| 2010/0011421 A1* | 1/2010 | Chari | G06F 21/31 | 726/5 |
| 2010/0058072 A1* | 3/2010 | Teow | G06F 21/6218 | 713/193 |
| 2010/0100925 A1* | 4/2010 | Hinton | G06F 21/10 | 726/1 |
| 2010/0100926 A1* | 4/2010 | Binding | G06F 21/41 | 726/1 |
| 2010/0132019 A1* | 5/2010 | Hardt | H04L 63/102 | 726/6 |
| 2010/0154041 A1* | 6/2010 | Dalzell | H04L 9/3213 | 726/6 |
| 2010/0250364 A1* | 9/2010 | Song | G06Q 40/12 | 707/758 |
| 2010/0299738 A1* | 11/2010 | Wahl | G06F 21/305 | 726/9 |
| 2010/0325441 A1* | 12/2010 | Laurie | H04L 9/3257 | 713/185 |
| 2011/0071857 A1* | 3/2011 | Malov | G06Q 40/06 | 705/4 |
| 2011/0145899 A1* | 6/2011 | Cao | H04L 9/3226 | 726/7 |
| 2012/0036360 A1* | 2/2012 | Bassu | H04L 9/3228 | 713/168 |
| 2012/0233705 A1* | 9/2012 | Boysen | G06F 21/77 | 726/29 |
| 2012/0290849 A1* | 11/2012 | Simske | H04L 9/3247 | 713/189 |
| 2012/0324551 A1* | 12/2012 | Bretschneider | G06F 21/45 | 726/5 |
| 2013/0006845 A1* | 1/2013 | Kremen | G06Q 40/025 | 705/38 |
| 2013/0073460 A1* | 3/2013 | Paquin | G06F 21/6263 | 705/44 |
| 2013/0111549 A1* | 5/2013 | Sowatskey | H04L 63/0823 | 726/3 |
| 2013/0117558 A1* | 5/2013 | Metke | G06F 21/33 | 713/156 |
| 2013/0125197 A1* | 5/2013 | Pravetz | H04L 63/08 | 726/1 |
| 2013/0125222 A1* | 5/2013 | Pravetz | H04L 67/22 | 726/6 |
| 2013/0205360 A1* | 8/2013 | Novak | H04L 63/102 | 726/1 |
| 2013/0212661 A1* | 8/2013 | Neafsey | G06F 21/31 | 726/6 |
| 2013/0246272 A1* | 9/2013 | Kirsch | G06Q 20/3821 | 705/44 |
| 2013/0275579 A1* | 10/2013 | Hernandez | H04L 41/5061 | 709/224 |
| 2013/0276140 A1* | 10/2013 | Coffing | H04W 4/21 | 726/27 |
| 2014/0068722 A1* | 3/2014 | Hayat | H04W 12/084 | 726/4 |
| 2014/0075516 A1* | 3/2014 | Chermside | G06F 21/10 | 726/4 |
| 2014/0172474 A1* | 6/2014 | Partridge | G06Q 10/02 | 705/5 |
| 2014/0173697 A1* | 6/2014 | Barbir | H04L 63/0815 | 726/4 |
| 2014/0173754 A1* | 6/2014 | Barbir | H04L 63/0815 | 726/28 |
| 2014/0181939 A1* | 6/2014 | Bonnell | H04L 63/08 | 726/7 |
| 2014/0279611 A1* | 9/2014 | Evans | G06Q 20/4014 | 705/317 |
| 2014/0310151 A1* | 10/2014 | Shishkov | G06Q 40/025 | 705/38 |

(56) References Cited

U.S. PATENT DOCUMENTS

| | | | |
|---|---|---|---|
| 2014/0351589 A1* | 11/2014 | Chenna | H04W 12/068 713/168 |
| 2014/0357187 A1* | 12/2014 | Ehrensvard | H04B 5/0031 455/41.1 |
| 2014/0359289 A1* | 12/2014 | Camenisch | H04L 9/0866 713/168 |
| 2015/0047003 A1* | 2/2015 | Khan | H04L 63/08 726/7 |
| 2015/0058940 A1 | 2/2015 | Robison et al. | |
| 2015/0058960 A1* | 2/2015 | Schmoyer | H04L 63/0807 726/8 |
| 2015/0089568 A1* | 3/2015 | Sprague | H04L 63/0876 726/1 |
| 2015/0089607 A1* | 3/2015 | Hubner | H04L 63/0838 726/6 |
| 2015/0089613 A1* | 3/2015 | Tippett | H04L 63/18 726/7 |
| 2015/0149336 A1* | 5/2015 | Haggerty | G06Q 30/0185 705/35 |
| 2015/0229479 A1* | 8/2015 | Cho | H04L 9/3247 713/156 |
| 2015/0269566 A1* | 9/2015 | Gaddam | G06Q 20/385 705/67 |
| 2015/0302413 A1* | 10/2015 | Dua | G06Q 20/4012 705/44 |
| 2015/0310195 A1* | 10/2015 | Bailor | G06F 21/316 726/6 |
| 2015/0332029 A1* | 11/2015 | Coxe | G06F 21/31 726/5 |
| 2015/0341370 A1* | 11/2015 | Khan | H04L 63/123 726/30 |
| 2015/0350177 A1* | 12/2015 | Sharp | G06Q 20/321 726/6 |
| 2015/0350210 A1* | 12/2015 | Thibadeau, Sr | G06F 21/31 726/7 |
| 2016/0094540 A1* | 3/2016 | Camenisch | H04L 9/085 726/8 |
| 2016/0134599 A1* | 5/2016 | Ross | H04L 63/08 713/168 |
| 2016/0171240 A1* | 6/2016 | Faher | H04L 63/0421 726/1 |
| 2017/0111333 A1* | 4/2017 | Smith | H04W 12/069 |
| 2017/0324750 A1* | 11/2017 | Khan | H04W 12/068 |
| 2018/0004930 A1* | 1/2018 | Csinger | H04L 63/0853 |
| 2018/0048474 A1* | 2/2018 | Landrock | H04L 9/14 |
| 2018/0121919 A1* | 5/2018 | Song | G06Q 40/12 |
| 2018/0197263 A1 | 7/2018 | Pearson et al. | |

FOREIGN PATENT DOCUMENTS

| | | |
|---|---|---|
| KR | 20150075064 A | 7/2015 |
| WO | WO-2017051250 A1 | 3/2017 |

OTHER PUBLICATIONS

Vullers et al., Efficient Selective Disclosure on Smart Cards Using Idemix, IFIP International Federation for Information Processing (Year: 2013).*

Bertino et al., Privacy-Preserving Trust Negotiations, ET 2004, LNCS 3424, pp. 283-301, (Year: 2005).*

Corradini et al., The e-Government digital credentials, Int. J. Electronic Governance (Year: 2007).*

Hajny et al., Unlinkable Attribute-Based Credentials with Practical Revocation on Smart-Cards, Springer-Verlag Berlin Heidelberg (Year: 2013).*

The Evolution of Near Field Communication (NFC)—from google.com—TechPats Blog (Year: 2021).*

Steve Brachmann, Evolution of Technology: Bluetooth, the once and future king; Posted In: IP News, IPWatchdog Articles, Technology & Innovation (Year: 2015).*

"European Application Serial No. 16187751.9, Communication Pursuant to Article 94(3) EPC dated Feb. 4, 2019", 7 pgs.

"European Application Serial No. 16187751.9, Extended European Search Report dated Jan. 4, 2017", 11 pgs.

"European Application Serial No. 16187751.9, Response filed Sep. 15, 2017 to Extended European Search Report dated Jan. 4, 2017", 10 pgs.

"European Application Serial No. 16798264.4, Response filed Nov. 13, 2018 to Communication pursuant to Rules 161(1) and 162 EPC dated May 4, 2018", 11 pgs.

"International Application Serial No. PCT/IB2016/001471, International Preliminary Report on Patentability dated Apr. 5, 2018", 10 pgs.

"International Application Serial No. PCT/IB2016/001471, International Search Report dated Dec. 20, 2016", 4 pgs.

"International Application Serial No. PCT/IB2016/001471, Written Opinion dated Dec. 20, 2016", 8 pgs.

Martin, Bryant, "5 mobile apps that could kill business cards", [Online] Retrieved from the internet: <https://thenextweb.com/apps/2011/01/23/5-mobile-apps-that-could-kill-business-cards/>, (Jan. 23, 2011), 1-4 pgs.

"European Application Serial No. 16187751.9, Response filed Sep. 5, 2019 to Communication Pursuant to Article 94(3) EPC dated Feb. 4, 2019", 12 pgs.

"U.S. Appl. No. 15/740,448, Non Final Office Action dated Dec. 26, 2019", 28 pgs.

"European Application Serial No. 16187751.9, Summons to Attend Oral Proceedings dated Nov. 5, 2019", 6 pgs.

"European Application Serial No. 16798264.4, Communication Pursuant to Article 94(3) EPC dated Jan. 31, 2020", 10 pgs.

Vercher, Brady, "Protect Your Products and Improve Your Systems with Signed URLs", BlazerSix Engage Blog, [Online] Retrieved from the Internet: <https://www.blazersix.com/blog/protect-your-products-and-improve-your-systems-with-signed-urls/>, (May 16, 2013), 6 pgs.

"U.S. Appl. No. 15/740,448, Final Office Action dated Jun. 25, 2020", 21 pgs.

"U.S. Appl. No. 15/740,448, Response filed Mar. 26, 2020 to Non Final Office Action dated Dec. 26, 2019", 14 pgs.

"U.S. Appl. No. 15/740,448, Response filed Aug. 25, 2020 to Final Office Action dated Jun. 25, 2020", 13 pgs.

"European Application Serial No. 16187751.9, Summons to Attend Oral Proceedings dated Apr. 29, 2020", 9 pgs.

"European Application Serial No. 16798264.4, Response filed Aug. 6, 2020 to Communication Pursuant to Article 94(3) EPC dated Jan. 31, 2020", 20 pgs.

"U.S. Appl. No. 15/740,448, Advisory Action dated Sep. 9, 2020", 3 pgs.

"U.S. Appl. No. 15/740,448, Non Final Office Action dated Feb. 2, 2021", 26 pgs.

"U.S. Appl. No. 15/740,448, Response filed Sep. 25, 2020 to Advisory Action dated Sep. 9, 2020", 16 pgs.

"U.S. Appl. No. 15/740,448, Response filed May 3, 2021 to Non Final Office Action dated Feb. 2, 2021", 13 pgs.

"U.S. Appl. No. 15/740,448, Advisory Action dated Oct. 26, 2021", 3 pgs.

"U.S. Appl. No. 15/740,448, Final Office Action dated Aug. 6, 2021", 31 pgs.

"U.S. Appl. No. 15/740,448, Response filed Oct. 6, 2021 to Final Office Action dated Aug. 6, 2021", 15 pgs.

"U.S. Appl. No. 15/740,448, Supplemental Response filed Nov. 8, 2021 to Advisory Action dated Oct. 26, 2021", 18 pgs.

"U.S. Appl. No. 15/740,448, Response filed Jun. 9, 2022 to Non Final Office Action dated Jan. 10, 2022", 15 pgs.

* cited by examiner

FIG. 7

VIRTUAL CREDENTIALS AND LICENSES

CROSS-REFERENCE TO RELATED APPLICATIONS

This application claims priority to U.S. Prov. App. No. 62/216,039, filed Sep. 9, 2015, entitled "VIRTUALIZED LICENSE DELIVERY" and to U.S. Prov. App. No. 62/232, 785, filed Sep. 25, 2015, entitled "VIRTUAL DRIVERS LICENSE" and is a continuation-in-part of International Application PCT/IB2016/000883, having an international filing date of Mar. 25, 2016, which claims priority to U.S. Prov. App. No. 62/138,555, filed Mar. 26, 2015, entitled "VIRTUALIZED LICENSE DELIVERY" and U.S. Prov. App. No. 62/216,039, filed Sep. 9, 2015, entitled "VIRTUALIZED LICENSE DELIVERY", all of which are incorporated by reference herein.

TECHNICAL FIELD

This application relates to the field of credentials and licenses and more particularly to the field of providing virtualized credentials and licenses.

BACKGROUND OF THE INVENTION

Governments and businesses are increasingly interested in issuing virtual ID cards to citizens, customers and employees. The virtual ID cards may be provided on mobile phones, or other similar personal computing device, and displayed using an app running on the device. In some cases, what verifying authorities need to know is not just the identity of the person before them, but instead, other information about the person such as the age of the person or the state of the licenses associated with that person (e.g., revoked, active, etc.). For example, a license holder may present their driver's license to service provider to prove the age of the license holder in connection with purchasing liquor even though the purchase of liquor is unrelated to the issuance by a state of the driver's license. Generally, a state issued driver's license is considered proof of identity and/or age in a number of situations unrelated to driving an automobile. The same may be true, perhaps to a lesser extent, to other types of licenses/credentials issued by government or other authorities.

A drawback to using licenses/credentials in this manner is that, in some cases, the recipient receives more information than is needed. In some cases, this may be of no consequence. However, in other cases, the license holder may not want the recipient to have access to the additional/unneeded information. For example, a driver's license holder may present their license to a bartender in connection with purchasing liquor, but the holder may not want the bartender to have access to the home address that is provided on the driver's license. A possible solution is to obtain another type of identification/proof of age credential that does not include a home address. However, this may not be practical for a number of reasons, such as the fact that the license/credential needs to be issued by an authority recognized by a recipient (e.g., the state registry of motor vehicles) and a user may not want to carry multiple licenses/credentials to be presented in different situations. Note also that a virtual ID card may need to be verifiable as authentic by a broad range of relying parties including police officers, security guards, hotel receptionists, retail staff, members of the general public, etc. but that a visual inspection may not be sufficient to establish authenticity since an image displayed on, for example, a smartphone, may easily be copied, shared and modified.

Accordingly, it is desirable to provide a license/credential that reduces the dissemination of unnecessary information while still being recognized and honored by a relying party.

SUMMARY OF THE INVENTION

According to the system described herein, providing virtualized credentials of a holder includes authorizing a subset of credential data to be sent to a device of a relying party that is different from the holder, where the subset of credential data depends on a role of the relying party, selection by the holder, and/or contextual data of the relying party and includes displaying at least some of the subset of credential data on a screen of the device of the relying party. The contextual data may be a privacy level setting, distance between the relying party and the holder, and/or geolocation of the relying party. The role of the relying party may be provided by the relying party. Role information provided by the relying party may be provided in a verifiable format. The role information may be digitally signed or securely derived and determined by a mutual authentication algorithm between the relying party and the holder. Providing virtualized credentials of a holder may also include the relying party presenting the subset of credential data to a verification service. The subset of credential data sent to the verification service may include a cryptogram generated as a function of cryptographic information associated with a device of the holder. The cryptographic information may include a cryptographic key stored on the device of the holder. The cryptogram may include a variable component corresponding to at least one of: time, a counter or a randomly generated nonce. The holder may provide a URL of the verification service to the relying party. The URL may be digitally signed. The verification service may redirect the relying party to another server. The relying party may communicate with an intermediary service that directs the relying party to a particular one of a number of possible verification services. An issuing authority that issues the virtualized credentials may filter information about the holder that is released to the relying party. The information may be filtered according to filtering rules stored by one of: the issuing authority or the holder.

According further to the system described herein, a non-transitory computer-readable medium contains software that provides virtualized credentials of a holder. The software includes executable code that authorizes a subset of credential data to be sent to a device of a relying party that is different from the holder, where the subset of credential data depends on a role of the relying party, selection by the holder, and/or contextual data of the relying party and includes executable code that causes at least some of the subset of credential data to be displayed on a screen of the device of the relying party. The contextual data may be a privacy level setting, distance between the relying party and the holder, and/or geolocation of the relying party. The role of the relying party may be provided by the relying party. Role information provided by the relying party may be provided in a verifiable format. The role information may be digitally signed or securely derived and determined by a mutual authentication algorithm between the relying party and the holder. The software may also include executable code that causes the relying party to present the subset of credential data to a verification service. The subset of credential data sent to the verification service may include a cryptogram generated as a function of cryptographic information associated with a device of the holder. The cryptographic information may include a cryptographic key stored on the device of the holder. The cryptogram may include a variable component corresponding to at least one of: time, a counter or a randomly generated nonce. The holder may provide a URL of the verification service to the relying party. The URL may be digitally signed. The verification service may redirect the relying party to another server. The relying party may communicate with an intermediary service that directs the relying party to a particular one of a number of possible verification services. An issuing authority that issues the virtualized credentials may filter information about the holder that is released to the relying party. The information may be filtered according to filtering rules stored by one of: the issuing authority or the holder.

According further to the system described herein, a system for providing a virtualized credential of a virtualized credential holder to a relying party includes a first device and a device of the relying party that is different from the first device. The first device is configured to authorize a subset of credential data to be sent to the device of the relying party, where the first device is configured to determine the subset of credential data to be sent based on a role of the relying party, selection by the holder, and/or contextual data of the relying party. The device of a relying party is configured to display at least some of the subset of credential data on a screen of the device of the relying party.

According further to the system described herein, providing virtualized credentials of a holder includes authorizing a subset of credential data to be sent to a device of a relying party that is different from the holder, where the subset of credential data depends on a role of the relying party and/or contextual data of the relying party and includes displaying the subset of credential data on a screen of the device of the relying party. The credential data may correspond to a license of the holder. The license may be a driver's license. The credential data may include insurance information of the holder. The contextual data may be geolocation of the relying party. The device of the relying party may be a laptop, a cellphone, or a tablet. The credential data may be provided by a device of the holder. The device of the holder may communicate directly with the device of the relying party. The credential data may be stored in a cloud and the subset of credential data may be sent from the cloud to the device of the relying party. The relying party may receive a release from the holder (possibly in the form of an access token) that allows the relying party to view the subset of credential data and/or access credential data from the cloud or some other source. An issuing authority that issues the virtualized credentials may filter information about the holder that is released to the relying party. The information may be filtered according to filtering rules stored by the issuing authority or the holder.

According further to the system described herein, a non-transitory computer-readable medium contains software that provides virtualized credentials of a holder. The software includes executable code that authorizes a subset of credential data to be sent to a device of a relying party that is different from the holder, where the subset of credential data depends on a role of the relying party and/or contextual data of the relying party and includes executable code that causes the subset of credential data to be displayed on a screen of the device of the relying party. The credential data may correspond to a license of the holder. The license may be a driver's license. The credential data may include insurance information of the holder. The contextual data may be geolocation of the relying party. The device of the relying party may be a laptop, a cellphone, or a tablet. The credential data may be provided by a device of the holder. The device of the holder may communicate directly with the device of the relying party. The credential data may be stored in a cloud and the subset of credential data may be sent from the cloud to the device of the relying party. The relying party may receive a release from the holder (possibly in the form of an access token) that allows the relying party to view the subset of credential data and/or access credential data from the cloud or some other source. An issuing authority that issues the virtualized credentials may filter information about the holder that is released to the relying party. The information may be filtered according to filtering rules stored by the issuing authority or the holder.

According further to the system described herein, providing virtualized credentials of a holder includes authorizing a subset of credential data to be sent to a device of a relying party that is different from the holder, where the subset of credential data depends on a role of the relying party, selection by the holder, and/or contextual data of the relying party and includes displaying the subset of credential data on a screen of the device of the relying party. The contextual data may be a privacy level setting and/or a geolocation of the relying party. The role of the relying party may be provided by the relying party. Role information provided by the relying party may be provided in a verifiable format, such as being digitally signed. Providing virtualized credentials of a holder may also include the relying party presenting the subset of credential data to a verification service. The holder may provide a URL of the verification service to the relying party. The URL may be digitally signed. The verification service may redirect the relying party to another server. The relying party may communicate with an intermediary service that directs the relying party to a particular one of a number of possible verification services.

According further to the system described herein, a non-transitory computer-readable medium contains software that provides virtualized credentials of a holder. The software includes executable code that authorizes a subset of credential data to be sent to a device of a relying party that is different from the holder, where the subset of credential data depends on a role of the relying party, selection by the holder, and/or contextual data of the relying party and includes executable code that causes the subset of credential data to be displayed on a screen of the device of the relying party. The contextual data may be a privacy level setting and/or a geolocation of the relying party. The role of the relying party may be provided by the relying party. Role information provided by the relying party may be provided in a verifiable format, such as being digitally signed. The software may also include executable code that causes the relying party to present the subset of credential data to a verification service. The holder may provide a URL of the verification service to the relying party. The URL may be digitally signed. The verification service may redirect the relying party to another server. The relying party may communicate with an intermediary service that directs the relying party to a particular one of a number of possible verification services.

User identity information could be anything that has a user's name and address, such as a QR code (QC code), image with watermark, etc. that is tied to a license, such as a driver's license, but also other types of licenses, such as a contracting licenses. The licensing information may be tied to insurance associated with that license. The licensing information may be displayed (read via wireless communication or by taking a photo of the information) from a cell phone of the holder, and delivered to a cell phone (ipad, etc.) of a receiver. The identity of the holder could optionally come from a web page where a service provided by the holder is requested (possibly a service of the license issuer), or from an email from the holder or from a proxy (for example confirming an appointment for requested service) to allow the receiver to preview credentials of the provider.

The system described herein may use the cloud to translate identity of a user with an associated license. An id may include a virtual identity from a licensing board that also indicates where to retrieve an actual license, and any required access method information. Input of the user optionally includes a release from the providing party (possibly in the form of an access token) to allow the relying party to read the license/insurance data and/or access the license/insurance data from the cloud or possibly some other source. The id and associated data may include an encrypted dynamic element to prevent a replay attack.

The relying party (possibly a police officer, or service provider such as a rental car agent) may receive on their cell phone (or a local display) a copy of the (drivers/auto) license, and any associated insurance and other data used by the receiver to validate the license holder, such as a biometric reference template. The received data is converted into graphical image(s) of the license which are displayed to a relying party. The graphical image(s) might be abbreviated in the case of poor communication lines or a small display. The format or content of an output may vary based on a wide range of conditions including the device type of the receiver, the role of the receiver and contextual data about the receiver such as geolocation. Optionally, the receiver may present their mobile device (i.e cell phone) for the license holder to present biometric input for validation, such as a fingerprint, iris scan, facial recognition, etc.

The system described herein provides for retrieval and verification of a virtualized license (or licenses) that are mastered within a central repository and which can be displayed on a smart device such as mobile phone. The identity of a user whose license is to be verified may be presented by the user on a mobile device of the user to a device (e.g., phone) of a relying party. The phone of the relying party may capture identity of the user using a camera on the phone of the relying party.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

The system described herein provides a mechanism for selectively providing license and/or credential information electronically in a way that can be verified by a relying party, which is a party that receives the information for possible verification, identification, etc.

Figure 1:
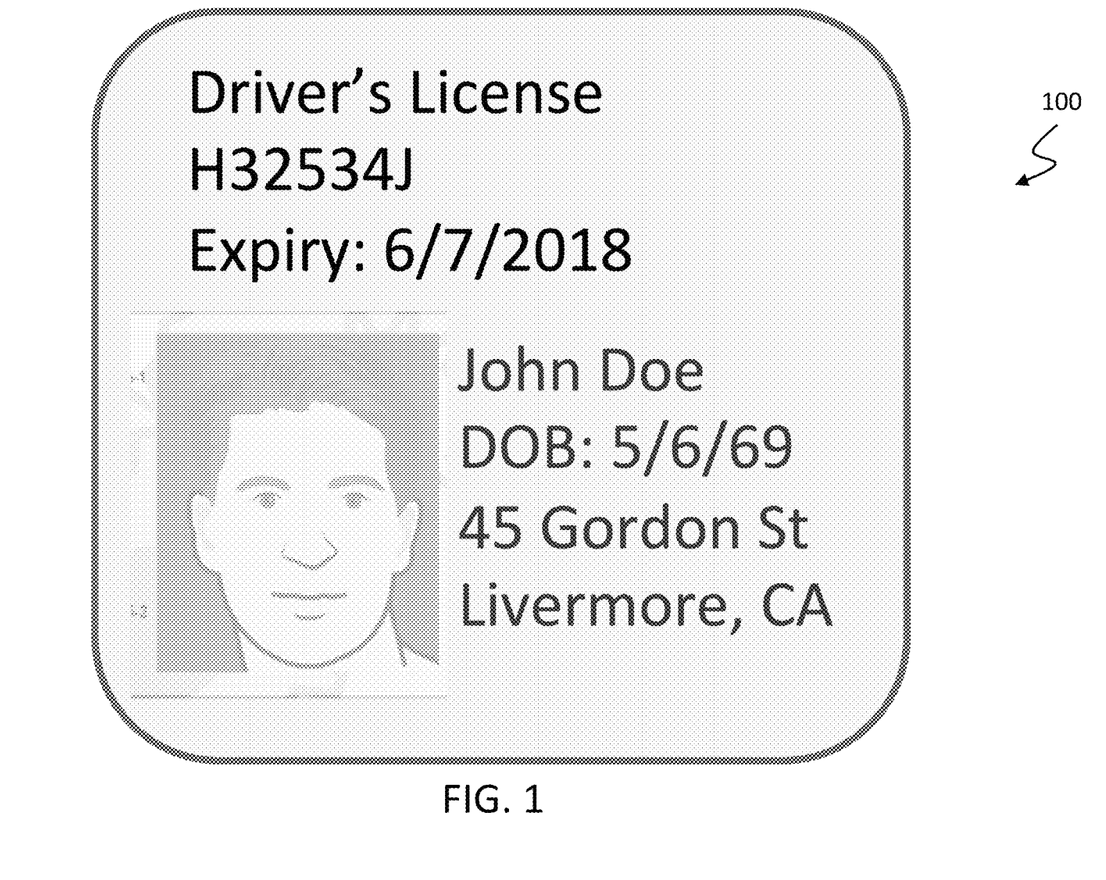
FIG. 1 is a schematic illustration showing a screen with driver's license information thereon according to an embodiment of the system described herein.

Referring to FIG. 1, a screen 100 is provided on a device, such as a smartphone, a tablet, etc. The screen 100 provides driver's license information, including date of birth, expiration, name, address, driver's license number, and a photograph of the owner of the driver's license. The driver's license information may include information that is found in standards such as the American Association of Motor Vehicle Administrators DL/ID Card. Design Standard published in August 2013 and available from http://www.aamva.org/DL-ID-Card-Design-Standard/. Any, appropriate information/data may be provided as driver's license information, including a QR code (QC code), an image with watermark, etc. that is tied to the driver's license. In some cases, automobile insurance information may be associated with the driver's license. The driver's license holder may input some or all of the information and/or another entity/party (e.g. state registry of motor vehicles) may enter some or all of the information. Note also that, although the system described herein is illustrated in connection with a driver's license, other types of licenses may be used instead and, in fact, other types or credentials/documents/authorizations may be used, such as a county hunting license, a city contractor license (plumber, electrician, etc.), a certificate of insurance, etc. Thus, the discussion of licenses, license holders, etc. herein should be understood to include, generically, any appropriate type of credentials, credential holders, etc. In some cases, it may be possible to combine different licenses, authorizations, credentials, etc. It is also possible to have a single instance that corresponds to all licenses, authorizations, credentials, etc. of a particular user.

The screen 100 may correspond to a display on a device of the license holder and may be viewed by the license holder either upon request or possibly in connection with the license holder providing a password, fingerprint, and/or some other type of authentication. Alternatively, the screen 100 may correspond to a screen on a device of a party other than the license holder (e.g., police officer, car rental agent, etc.) and the information provided on the screen 100 may be provided with or without the consent of the license holder, as described in more detail elsewhere herein. In some cases, information provided to a party other than the license holder may include an indication of what the license holder used to validate/authorize a particular request. The screen 100 may provide information that identifies the license holder, such as a social security number of the license holder (possibly embedded within a QR/QC code), an image of a passport of the license holder, a picture id that contains a name and address of the license holder, an image of a driver's license of the license holder, an image of an auto license plate of the license holder, etc.

Figure 2:
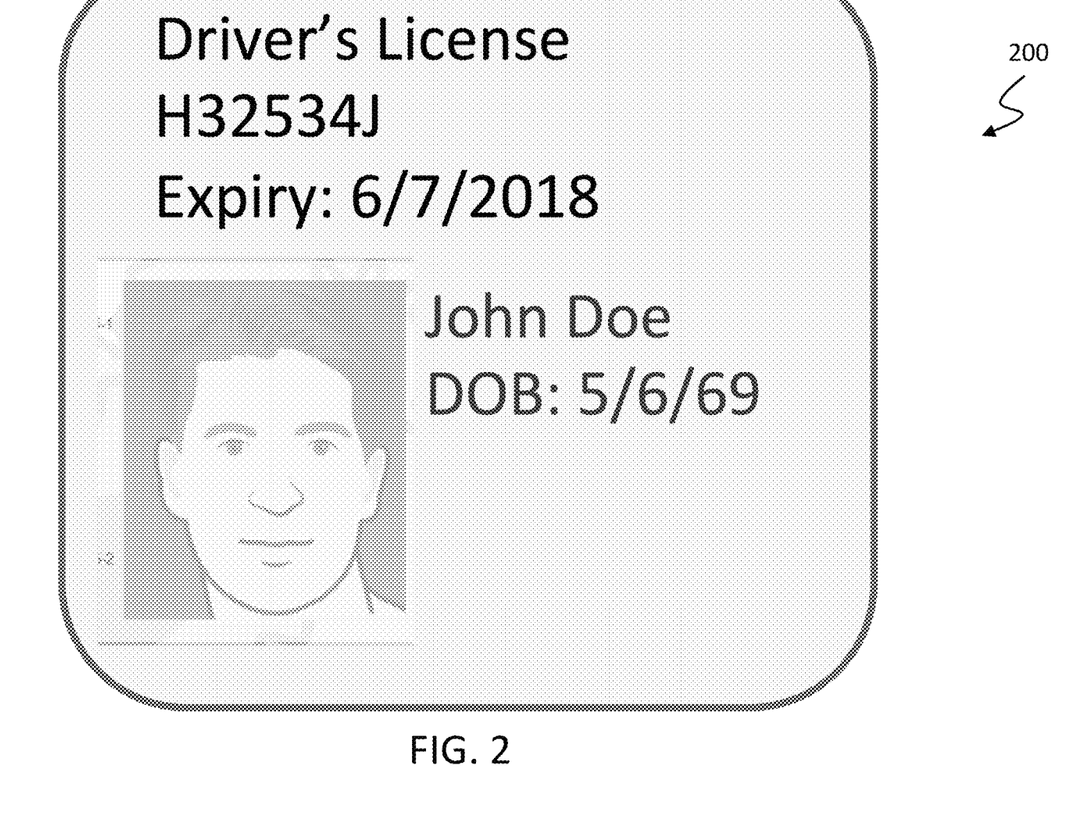
FIG. 2 is a schematic illustration showing a screen with a subset of driver's license information thereon according to an embodiment of the system described herein.

Referring to FIG. 2, a screen 200 provided on a device is similar to the screen 100, discussed elsewhere herein, except that the screen 200 does not include all of the information provided on the screen 100. In some embodiments, the screen 200 may be presented on a device of the license holder in response to a specific input by the license holder to hide some of the information. For example, if the license holder uses the device/license to purchase liquor, the photograph, date of birth, and driver's license number may be useful, but the home address of the license holder is not necessary and, in some cases, the license holder may wish to prevent another party, such as a bartender, from seeing a home address of the license holder. Note that, instead of dime data of birth, it may be possible to provide (i.e., by default) just an indicator that the license holder is over 21. The license holder may control on an ad hoc basis which data is presented. For instance, the license holder may make a selection on their device not to display/send a home address when a relying party is, for example, a bartender.

In some cases, the role of a relying party may be provided to the license holder (i.e., electronically) and the information provided to the relying party may depend upon the role of the relying party. For example, if the relying party has a role of "law enforcement", then more information (e.g., home address) may be provided to the relying party than would be provided to a relying party having a role of "bartender". In some cases, the role information may be provided in a format that can be verified (e.g., digitally signed or otherwise be derived via a process of mutual authentication where the relying party is authenticated to the license holder along with some role identifying attributes that are sent via the mutual authentication). Using a format that can be verified prevents, for example, the license holder from authorizing information to be provided to someone fraudulently posing as a member of law enforcement.

In some cases, particular information that is provided to the relying party may be a function of a role of a relying party and a distance between the relying party and the license holder, where different roles result in different maximum distances for authorizing providing information. For example, if the relying party has a role of "law enforcement", then the information may be provided to the relying party up to a distance of fifteen meters whereas if the relying party has a role of "bartender", the information may be provided only be up to three meters distance.

It is also possible to provide or not provide specific information based on contextual data, such as geolocation of the license holder and/or relying party, where, for example, a photograph of the license holder is not provided in locations where photographs are discouraged for religious reasons. Note that, in some cases, a subset of information is provided due to limitations in communication and/or of the receiving device, for example, in instances communication bandwidth limitations might cause any provided graphic image to be abbreviated (reduced in size/resolution).

Alternatively, license holder information may be transmitted to a device of a party other than the license holder so that, for example, the screen 200 is provided on a device of a bartender that needs to determine if it is appropriate to serve alcohol to the license holder. The amount and type of information provided to a relying party may be controlled so that different parties receive different information according to a role of the relying party. For example, a relying party having a role of "law enforcement" may be provided with all of the driver's license information while a relying party having a role "commercial service provider" may be provided with a subset of the information that does not include the home address of the driver's license holder. The license holder may control on an ad hoc basis which data is sent to a recipient. For instance, the license holder may make a selection on their device not to display/send a home address when the relying party is, for example, a bartender, even if the relying party does not send role information to the device of the license holder. In some instances, the subset information provided may vary according to contextual data corresponding to a privacy level setting so that, for example, in some cases an actual data of birth is provided while in other cases only an indication that the license holder is over 21 is provided.

Figure 3:
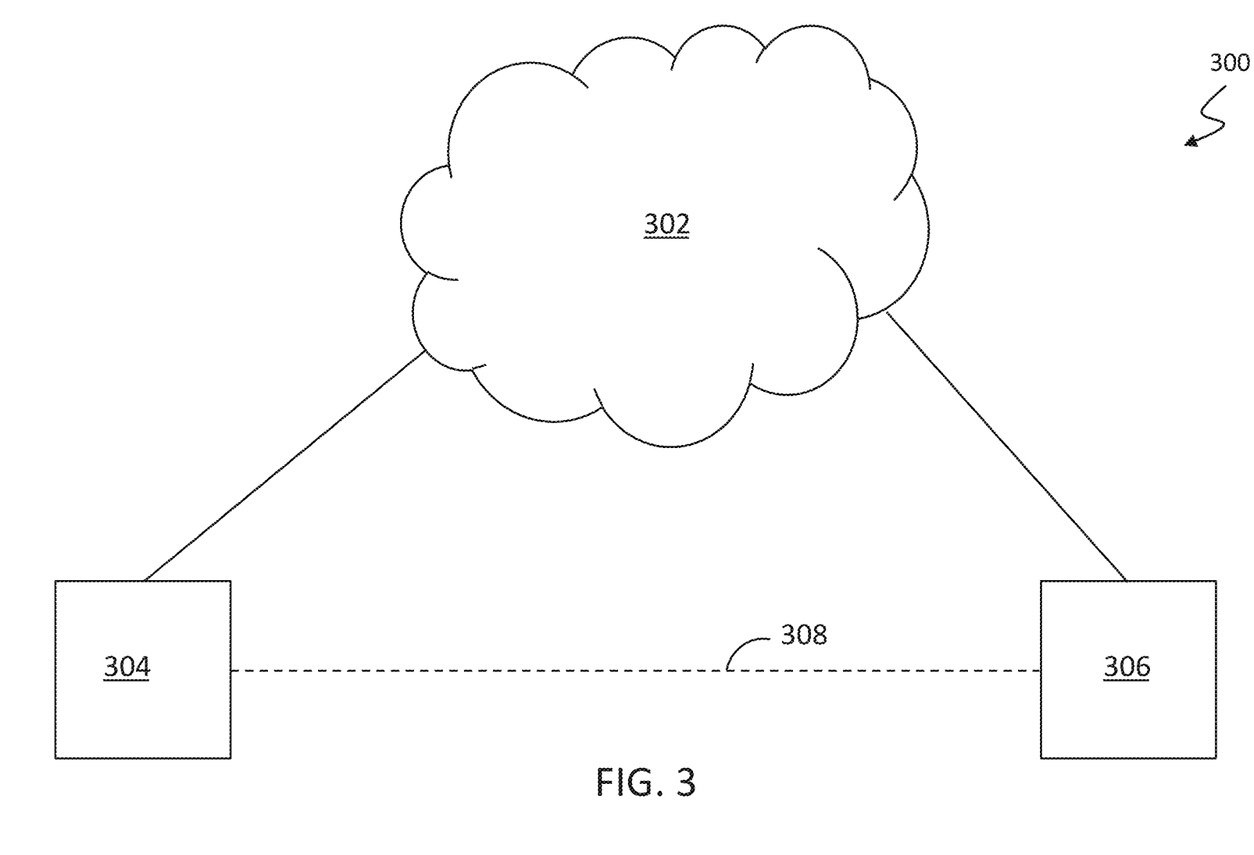
FIG. 3 is a schematic illustration showing a license holder device, a relying party device and a communications/cloud infrastructure according to an embodiment of the system described herein.

Referring to FIG. 3, a diagram 300 shows a network/cloud infrastructure 302, a license holder device 304, and a relying party device 306. The infrastructure 302 represents both communication mechanisms between the devices 304, 306, such as a cellular telephone network, and represents storage/processing that may be performed on behalf of the devices 304, 306. For example, information about the license holder may be stored in cloud storage (the infrastructure 302) and then conveyed to the relying party device 306 upon occurrence of a particular event, such as the license holder entering a password, fingerprint (or similar) on the license holder device 304 to authorize transferring information from the cloud to the relying party device. It is also possible for the event to be simply close proximity of the devices 304, 306. For example, if the relying party is a law enforcement official, then it is possible to have the infrastructure 302 provide information about the license holder to the relying party device 306 in response to the license holder device 304 becoming proximate to the relying party device 306. Thus, for example, a bartender may gather together a group of N (for example 5) individuals (all within device proximity limitations), receive N notifications that each is authorized (over 21), and allow access to the facility to all of the individuals in the group.

In other embodiments, information may be transferred from the license holder device 304 to the relying party device 306 either through the infrastructure 302 or via a more direct link 308 therebetween. Note that the link can be any type of data communication mechanism, such as an Internet connection, WiFi, a Bluetooth connection, etc. In some embodiments, the devices 304, 306 may be connected to each other using a physical wire, such as an electrical wire, a Fiber-optic link, etc. Information may be conveyed between the devices 304, 306 upon occurrence of a particular event, such as the license holder entering a password, fingerprint (or similar) on the license holder device 304 to authorize transferring information from the cloud to the relying party device close proximity of the devices 304, 306, as discussed elsewhere herein.

In some instances, the device 306 may be a laptop or desktop computer (or similar) and information may be provided to a relying party via a Web page (or similar) that the relying party accesses, possibly only after the license holder provides authorization. It is also possible to provide information to the relying party via an email that is sent by the license holder or by a proxy, possibly after authorization of the license holder. Note that, in some cases, it is possible for a relying party to not have a device at all but, instead, to visually inspect the license holder device 304 and/or take a photograph of the screen thereof.

Figure 4:
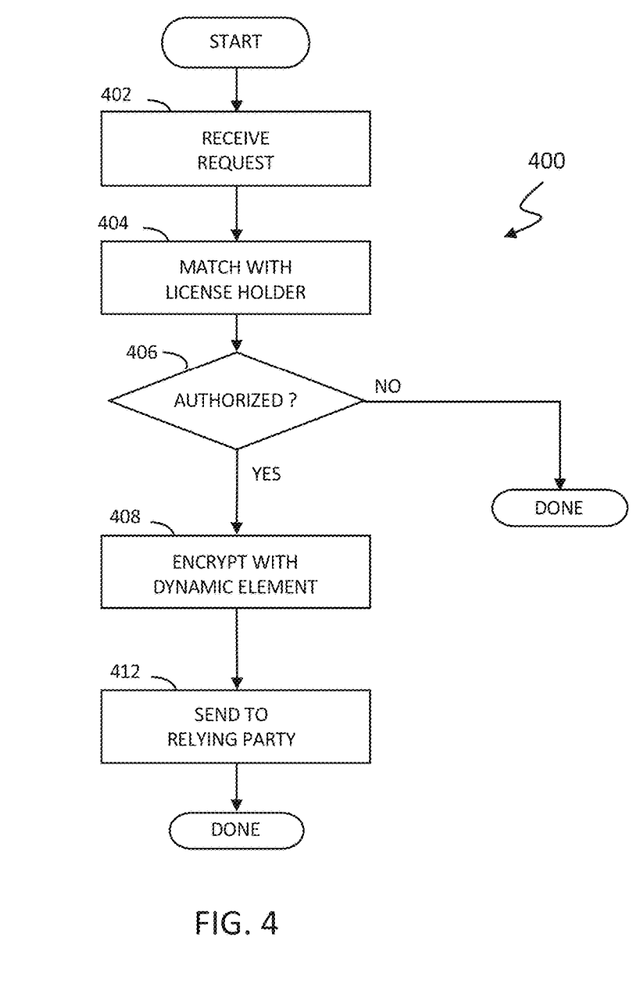
FIG. 4 is a flow diagram illustrating processing performed by a communications/cloud infrastructure according to an embodiment of the system described herein.

Referring to FIG. 4, a flow diagram 400 illustrates steps performed in connection with the communications/cloud infrastructure 302 providing information to a relying party. Processing begins at a first step 402 where a request is received. In some embodiments, the relying party requests the information from a license holder so the request received at the step 402 is from the relying party. In other embodiments, the request may be provided by the license holder to send the information to the relying party so that the request received at the step 402 is from the license holder. In either case, the request may include one or more tokens, or similar, which is a data element that contains information about the license holder but does not directly identify the license holder (and may or may not directly identify the relying party).

In instances where an identity is indirectly tied to the license holder, an external database may map a token to the identity of the license holder. The external database/data used for mapping may be separate from any other database/data containing personal information about the license holder. Following the step 402 is a step 404 where the token(s) are matched by the infrastructure 302 to information for the license holder and/or the relying party. In some cases, the token(s) may indicate where to retrieve the requested license information and possibly required access information (i.e., credentials for remote systems that are accessed). Following the step 404 is a test step 406 where it is determined if the request is authorized. As discussed elsewhere herein, it may be necessary for the license holder to provide authorization in the form of a password, fingerprint, etc. In some cases, the license holder may need to provide a release (possibly in the form of an access token) to authorize the relying party to read the license information and/or access license information from the cloud, including possibly information about insurance. Note that authorization may include having the relying party (e.g., a police officer) present their device to the license holder who then provides a password, a fingerprint, etc. to the device of the relying party.

If it is determined at the 406 that the request is not authorized, then processing is complete (i.e., no information will be provided or only information indicating that the request was not authorized). Otherwise, control transfers from the test step 406 to a step 408 where the requested information is encrypted with a dynamic element (to guard against replay attacks). Following the step 408, control transfers to a step 412 where the requested information is sent to the relying party. Following the step 412, processing is complete.

Figure 5:
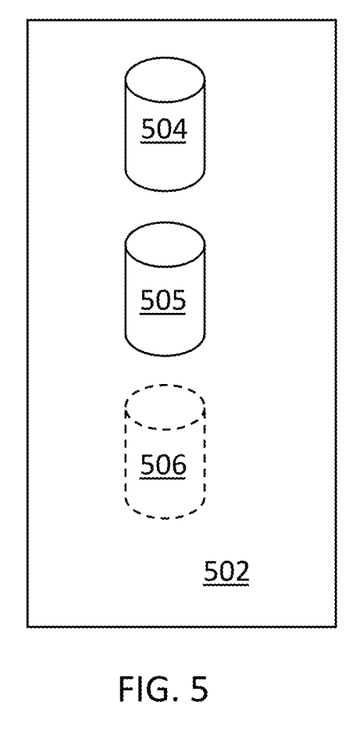
FIG. 5 is a schematic illustration showing a license holder device containing license/credential information, an authentication cryptogram, and possibly policy information according to an embodiment of the system described herein.

Referring to FIG. 5, a mobile device 502, such as a smartphone, includes a cryptograph key 504 (possibly a unique cryptographic key) that is securely provisioned in the mobile device 502. The mobile device 502 may be used by a license holder in connection with the system described herein. The cryptographic key 504 may be a symmetric key or part of an asymmetric private/public key pair. The mobile device 502 also includes license data 505 that contains information for license(s)/credentials provided with the mobile device 502. The license data 505 may include one or more visual images of the license holder that are displayed on the mobile device 502 as well as information and/or graphical images for indicating information associated with the license(s)/credentials, such as date of birth, specific authorizations, etc.

The mobile device 502 may optionally include policy data 506, which provides information regarding operation/use of the corresponding license(s)/credentials. For example, the policy data 506 may include information that causes home address information for the license holder to be withheld if the relying party has a role of "bartender". Other policy information may indicate whether it is permissible to have the license data 505 stored on other devices in addition to the mobile device 502. Note that, as discussed elsewhere herein, it is possible for some or all of the policy information for the license data 505 and corresponding virtual license(s) to be stored elsewhere, such as in the network/cloud infrastructure 302, discussed elsewhere herein.

The cryptographic key 504 may be used (e.g., by the mobile device 502) to generate a cryptogram that validates the license data 505. In an embodiment herein, a relying party may use the cryptogram to ensure that the license holder is presenting valid data. For example, if the license data 505 corresponds to a motor vehicle license, then the cryptogram may include the license data digitally signed with the cryptographic key 504, which may be a private key corresponding to a public key of an issuing authority, such as a state motor vehicle department. In another embodiment, the cryptogram may include a private key corresponding to a public/private key pair specific to the license with a public license key additionally signed by an issuing authority and a public key of the issuing authority attached, concatenated or stored with the public license key. Note that it is possible to use any appropriate cryptographic information associated with the license holder to generate the cryptogram. Thus, for example, instead of the cryptographic key 504 stored on the mobile device 502, it is possible to use other information associated with the license holder, but stored in another location, such as in the cloud, to generate the cryptogram.

A relying party, such as a police officer, may then validate the license data by applying the public key to the cryptogram which results in the license data 505 if the license data 505 is valid. Other values/information may be used with the cryptographic key 504 to generate the cryptogram, such as an event counter, a time stamp, a nonce, etc. Other possible values/information include a unique identifier for the virtual license, a unique identifier for a user identifier that is mapped to the virtual license, an indicator of a particular type (e.g., driver's license, fishing license, etc.) of the virtual license/credential, one or more identifiers that collectively describe or identify, service(s) that may be used to verify the authenticity of the virtual license/credential (i.e., a verification service), an identifier of a party that issued the virtual license/credential, etc.

In some instances, the same license data 505 may be provided on multiple devices, but each of the devices may have a different cryptographic key. Of course, it is also possible for some or all of the multiple devices to use the same cryptographic key. In some cases, the cryptographic key 504 may only be valid for a finite amount of time after which a replacement cryptographic key is provided. Information regarding operation, limits, range, etc. of the cryptographic key 504 may be provided by the policy data 506. The cryptogram may be regenerated (changed to an unpredictable value) for each verification to prevent a replay.

The mobile device 502 may provide information to a different device (not shown in FIG. 5) for validation. The different device may be a mobile device of a relying party. In some embodiments, the cryptogram 504 and possibly some or all of the license data 505 and possibly some or all of the policy data 506 may be encoded within a bar code that is displayed on the mobile device 502. The relying party may then take a photo of the bar code or otherwise visually input the bar code for verification. In another embodiment, the cryptogram 504 and possibly some or all of the license data 505 and possibly some or all of the policy data 506 may be encoded into a digital watermark within an image of the virtual license displayed on the device 502. The relying party may then take a photo of the image with the watermark or otherwise visually input the image with the watermark for verification. Generally, the cryptogram 504 and possibly some or all of the license data 505 and possibly some or all of the policy data 506 may be encoded into a visual image that is provided to a device of the relying party. In other embodiments, the cryptogram 504 and possibly some or all of the license data 505 and possibly some or all of the policy data 506 may be communicated to the relying party using NFC, Bluetooth, or similar. It is also possible for the cryptogram 504 and possibly some or all of the license data 505 and possibly some or all of the policy data 506 to be communicated to the relying party via a non direct channel, such as email or SMS.

Figure 6A:
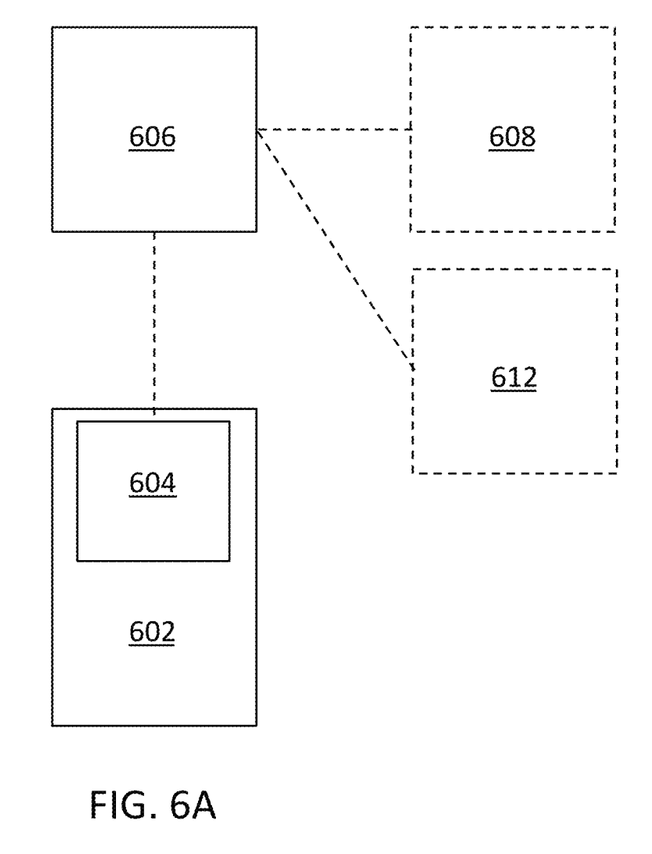
FIGS. 6A and 6B are schematic illustrations showing a verifying device containing a verification app that communicates with one or more verification services according to embodiments of the system described herein.

Referring to FIG. 6A, a device 602 (verifying device) of a relying party has received from a license holder information that requires validation (e.g., the cryptogram 504 and possibly some or all of the license data 505 and possibly some or all of the policy data 506). The device 602 may be a mobile device, such as a smartphone, that runs a verification app 604 to verify the received information. The verification app 604 may receive the information that requires validation and may then determine a URL of a validation service 606 (separate from the device 602) capable of verifying the information that requires validation. After determining the verification service 606, the verification app 604 may invoke the verification service 606 by transmitting the information that requires validation (including, in some cases, the cryptogram) to the verification service 606. Invocation of the verification service 606 may be logged by the verification service 606, providing an auditable record of each verification request. The verification service 606 may validate the information that requires validation and respond with a verified version of the license data 505, an image corresponding to an image from the license data 505, or some other data. Note that, in some cases, the verification service 606 may return an indication that the information is not valid. Information may not be valid for any number of reasons, such as the information being fraudulent. In some cases, the information may be deemed not valid by the verification service 606 for other reasons, such as expiration of a license.

The data/image returned by the verification service 606 to the verification app 604 may depend on a number of factors, including, possibly, information provided by the policy data 506, the type of license (e.g., driver's license, fishing license, etc.), the role of the relying party (e.g., police officer, bartender, etc.), and/or other contextual information that may be provided by the verification app 604 to the verification service 606. Note that some or all of the contextual information may be generated by the device 602 and/or provided to the verification app 604 by other local devices, separate from the device 602 (and possibly separate from the device 502 of the license holder), such as Bluetooth beacons or RFID tags. In some cases, contextual information may include speed information for an Internet connection used by the device 602, which may allow adjustment of volume of data, image formats, etc. returned by the verification service 606. Similarly, the verification app 604 may identify whether the verification app 604 is running on a laptop or mobile phone (i.e., whether the device 602 is a laptop or mobile phone), which may allow adjustment of volume of data, image formats, etc. returned by the verification service 606.

In some embodiments, the verification app 604 may be able to provide evidence of the trustworthiness of the endpoint device on which the verification app 604 is executing. For example, the verification app 604 may indicate that the device 602 has been "jail broken" or that the verification app 604 is being executed in a trusted environment, such as a Samsung Knox device. The level of trustworthiness may allow adjustment of a type of data returned by the verification service 606. In some cases, there may be multiple different implementations/configurations of the verification app 604 so that the verification service 606 returns one data set to a version of the verification app 604 that is used exclusively by police officers and returns another, different, data set to a different version of the verification app 604 that is optimized for use by park rangers or optimized for use by bar staff to verify proof of age or used by homeowners to verify a contractor license and retrieve insurance details. In some embodiments, a particular data set that is returned by the verification service 606 may vary depending on a physical location of the device 602 executing the verification app 604 or on a time of day. If the verification service 606 is not able to respond in real time to the verification app 604, the verification service 606 may process a request from the verification app 604 offline and issue, at a later date, a notification to the verification app 604 containing the requested verification information.

The verification app 604 may parse images and/or data returned by the verification service 606 and highlight contextually relevant aspects for a relying party using the device 602. For example, if the verification app 604 is used for a hunting license, the verification app 604 may indicate whether the license is valid for a location at which verification is taking place. As another example, the verification app 604 may be used by bar staff and thus may highlight to the relying party if the license holder is not old enough to drink alcohol. As yet another example, the verification app 604 may be used by a police officer and therefore may be capable of performing a biometric match such as a facial recognition, iris scan, and/or finger print check, by comparing a photo or fingerprint taken by the officer with image/data information returned by the verification server. The verification app 604 may provide an option for a relying party to record a result of a successful or unsuccessful verification. The result may be recorded on the verification server 606, a different server 608, and/or with the verification app 604.

The verification service 606 need not store all data that needs to be returned to the verification app 604. The verification service 606 may redirect the verification app 604 to a secondary service 612, passing a token that is trusted by the secondary service 612 so that the secondary service 612 provides requested information back to the verification app 604. For example, there may be a fishing license database that is separate from the verification service 606 so that the verification service 606 redirects the verification app 604 to a separate service that accesses the fishing license database to provide information to the verification app 604.

Figure 6B:
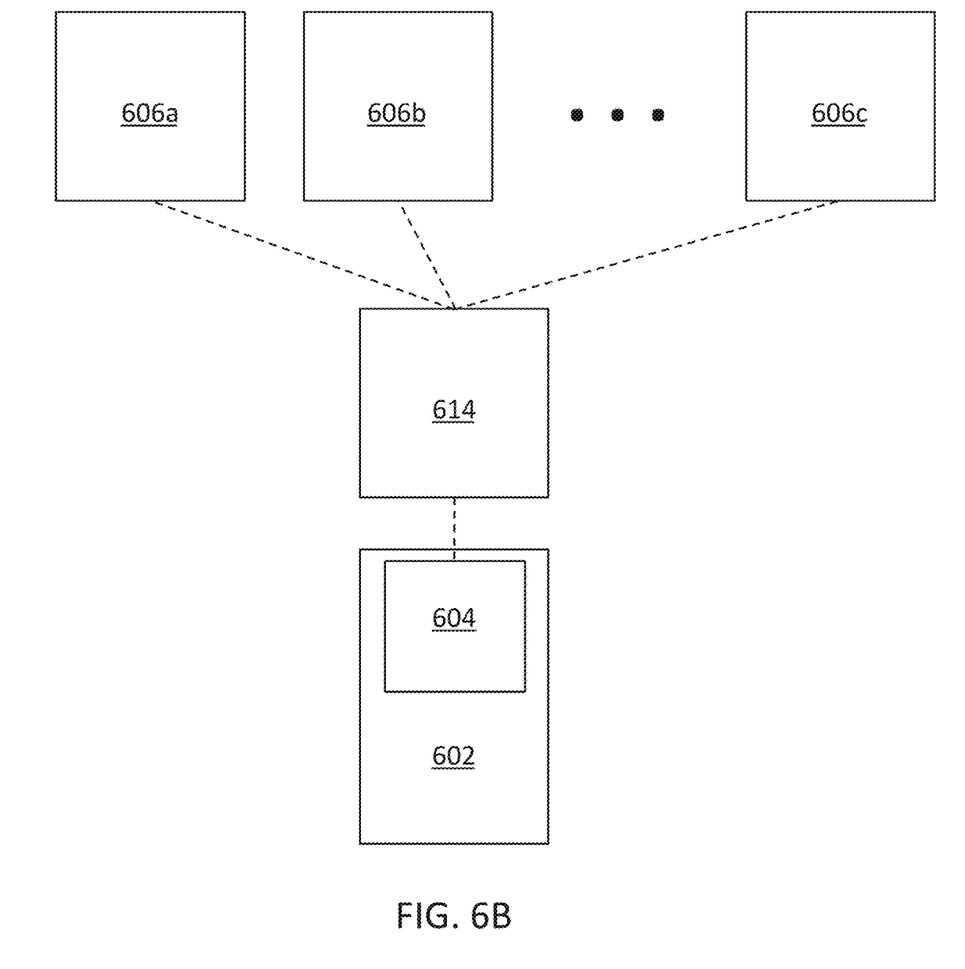

Referring to FIG. 6B, in some embodiments, the verification app 604 may not communicate directly with a verification service. Instead, the verification app 604 communicates through an intermediary service 614 that acts as an aggregator across multiple verification services 606a-606c. The intermediary service 614 may play an active role in determination of which of the verification services 606a-606c to use. An example of an intermediary service would be a service that aggregates information on many licensed contractors across multiple fields of professional expertise (similar to how the Angie's List service works). In some instances, the intermediary service 614 may provide the verification app 604 to the relying party.

Figure 7:
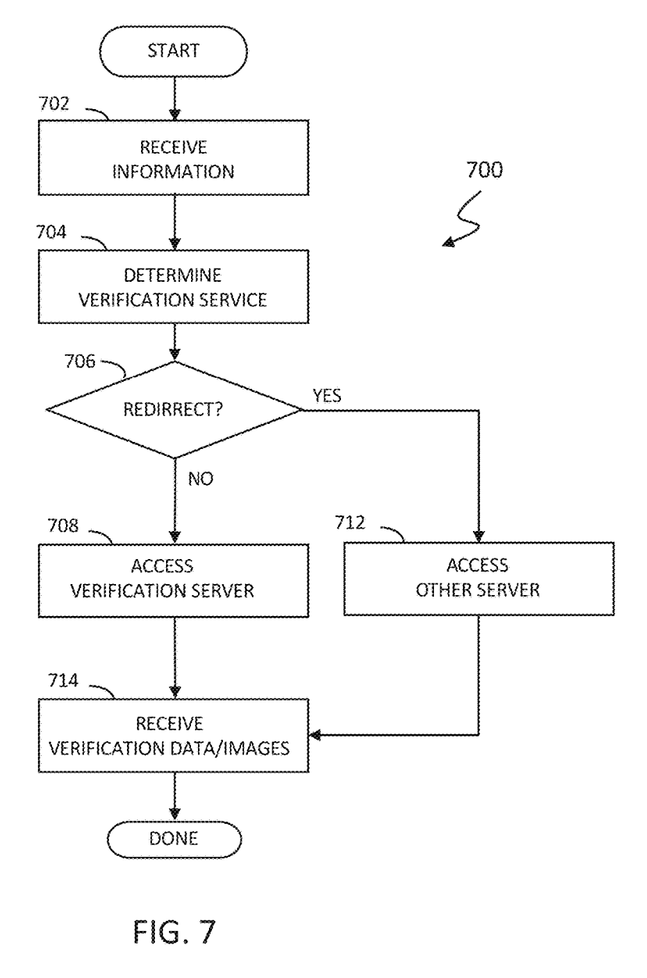
FIG. 7 is a flow diagram illustrating processing performed by a verifying device according to an embodiment of the system described herein.

Referring to FIG. 7, a flow diagram 700 illustrates steps performed by a device of a relying party in connection with validating information from a license holder. Processing begins at a first step 702 where the device of the relying party receives information from the license holder, either directly or through a cloud service (or similar) as discussed elsewhere herein. The information may include a cryptogram, license data, policy information, etc. Following the step 702 is a step 704 where a verification service is determined. As discussed elsewhere herein, the device of the relying party may contain one or more URLs for different verification services where a particular one of the URLs is chosen based on information provided by the license holder. Alternatively, the license holder may provide the URL, which may be digitally signed (or similar). A URL provided by the license holder may contain embedded security features such as a One Time Password that may be validated by the authentication server to guard against a replay of an earlier request.

Following the step 704 is a test step 706 where it is determined if the device of the relying party is being redirected to another server for verification data. As discussed elsewhere herein, in some cases a relying party may be directed to a different server for information. If not, then control passes from the test step 706 to a step 708 where the device of the relying party accesses the verification server. Otherwise, control passes from the test step 706 to a step 712 where the device of the relying party accesses an other server. Following the step 708 or the step 712 is a step 714 where the device of the relying party receives verification information, as discussed elsewhere herein. Following the step 714, processing is complete.

The system described herein may have many possible uses. For example, a hotel receptionist may use a mobile phone (receptionist mobile phone) to validate authenticity of a driver's license presented on a mobile phone of a guest (guest mobile phone) checking in to the hotel. The guest begins by opening a driver's license app on the guest mobile phone. The driver's license app displays a virtual representation of a driver's license, including a license number, a name of the guest, a date of birth of the guest, an address of the guest, an expiry date, and a photo of the license holder. The guest may then touch the image of the driver's license displayed on the guest mobile phone, which responds by generating and displaying a 2-D barcode. The 2-D barcode has encoded therein information indicating an issuing state of the driver's license, a license number, and an authentication cryptogram. The receptionist opens a driver's license verification app on the receptionist mobile phone and uses the verification app to take a photo of the 2-D barcode displayed on the guest mobile phone. The verification app decodes the 2-D barcode and connects to a trusted verification service corresponding to a particular state that issued the driver's licenses, passing the license number and the authentication cryptogram. The trusted verification service validates that the submitted authentication cryptogram is valid for the license number passed thereto and responds with a pre-constructed image of the driver's license of the guest. The pre-constructed image, which may include a photo, name, date of birth, etc., is displayed on the receptionist mobile phone. The receptionist is able to do a visual comparison of the image of the license displayed on the receptionist phone with an image of the license displayed on the guest mobile phone, thereby enabling the receptionist to confirm authenticity of the mobile driver's license of the guest.

An alternative example relates to enabling a police officer to use a mobile phone (verifying device) to validate authenticity of a driver's license (license holder device). Initially, the driver opens a license app on the license holder device, which may be a smartphone or a tablet. The license app displays an image corresponding to a driver's license, including a license number, name, date of birth, address, expiry date and a photo of the driver (license holder). The police officer opens a driver's license verification app on the verifying device, which also may be a smartphone or tablet, but could also be a laptop or other type of computing device. The driver may then touch the image of the driver's license displayed on the license holder device, which responds by generating an authentication cryptogram. The authentication cryptogram is transmitted to the verifying device (using, for example, Bluetooth Smart technology or some other type of appropriate communication system) along with information indicating an issuing state and a license number. The verification app then connects to a verification service for the issuing state, passing the license number and the authentication cryptogram. The verification service validates that the submitted authentication cryptogram is valid for the license number and responds to the verifying device with confirmation of authenticity for the driver's license, plus (possibly) additional relevant information regarding the driver. The information received by the verifying device is displayed on the verifying device for the police officer to view.

Yet another example illustrates a consumer using a mobile phone (or similar device) to validate authenticity of a license presented by a contractor, taxi driver, real estate agent or other licensed professional and to verify insurance details of the licensed professional. Initially, the licensee opens a professional license app on a license holder device, which may be a mobile phone, a tablet, or similar. The license app displays an image corresponding to a license to practice, including information such as a license number, name, professional services that the license holder is licensed to practice, expiry date and a photo of the licensee. The licensee then touches the image on the license holder device, which responds by generating and displaying a 2-D barcode, into which is encoded an issuer of the license, the license number, a type of license (e.g., electrical, plumping, etc.), a signed URL that identifies a trusted verification service and an authentication cryptogram. The consumer opens a license verification app on a verifying device (the mobile phone, or similar, of the consumer) and uses the license verification app to take a photo of the 2-D barcode displayed on the license holder device. The verification app decodes the 2-D bar code, confirms the signature of the URL, and connects to the trusted verification service, passing the license number and the authentication cryptogram. The trusted verification service validates that the submitted authentication cryptogram is valid for the license number and responds with a confirmation of validity and details on an insurance policy of the licensee. The verification app may subsequently provide supplementary services such as verifying that the insurance of the licensee is valid to cover a proposed work schedule.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

What is claimed is:

1. A method of providing a virtualized credential of a holder, comprising:
for a given credential having credential data, authorizing a subset of the credential data to be sent to a device of a relying party that is different from the holder, wherein the subset of the credential data selected from the credential data depends on at least one of: a role of the relying party, selection by the holder, and contextual data of the relying party;
transmitting a cryptogram from a device of the holder to the device of the relying party using a direct NFC or Bluetooth communication link between the device of the holder and the device of the relying party, the cryptogram including the subset of the credential data and being generated as a function of cryptographic information associated with a device of the holder;
presenting the cryptogram to a verification service for verification and receiving, in response to the verification, a verified version of the subset of the credential data; and
displaying at least some of the verified version of the subset of the credential data on a screen of the device of the relying party.

2. The method, according to claim 1, wherein the contextual data is at least one of: a privacy level setting, distance between the relying party and the holder, and geolocation of the relying party.

3. The method, according to claim 1, wherein the role of the relying party is provided by the relying party.

4. The method, according to claim 3, wherein role information provided by the relying party is provided in a verifiable format.

5. The method, according to claim 4, wherein the role information is one of: digitally signed or securely derived and determined by a mutual authentication algorithm between the relying party and the holder.

6. The method, according to claim 1, wherein the cryptographic information includes a cryptographic key stored on the device of the holder.

7. The method, according to claim 1, wherein the cryptogram is presented to the verification service via a URL of the verification service.

8. The method, according to claim 7, wherein the URL is provided by the holder to the relying party and is digitally signed.

9. The method, according to claim 1, wherein the verification service redirects the device of the relying party to another server for the verification.

10. The method, according to claim 1, wherein an intermediary service determines the verification service from a number of possible verification services.

11. The method, according to claim 1, wherein:
an issuing authority that issued the virtualized credential filters information about the holder that is released to the relying party; and
the information is filtered according to filtering rules stored by one of: the issuing authority or the holder.

12. The method of claim 1, wherein:
receiving the verified version of the subset of the credential data comprises receiving an image of the holder from the verification service at the relying party device; and
displaying at least some of the verified version of the subset of the credential data on the screen of the device of the relying party comprises displaying the image of the holder received from the verification service.

13. The method, according to claim 1, wherein the cryptogram includes a variable component corresponding to at least one of: time, a counter, or a randomly generated nonce.

14. A non-transitory computer-readable medium containing software that provides a virtualized credential of a holder, the software comprising:
executable code that, for a given credential having credential data, authorizes a subset of the credential data to be sent to a device of a relying party that is different from the holder, wherein the subset of the credential data selected from the credential data depends on at least one of: a role of the relying party, selection by the holder, and contextual data of the relying party;
executable code that transmits a cryptogram from a device of the holder to the device of the relying party using a direct NFC or Bluetooth communication link between the device of the holder and the device of the relying party, the cryptogram including the subset of the credential data and being generated as a function of cryptographic information associated with a device of the holder;
executable code that presents the cryptogram to a verification service for verification;
executable code that, in response to the verification, receives a verified version of the subset of the credential data; and
executable code that causes at least some of the verified version of the subset of the credential data to be displayed on a screen of the device of the relying party.

15. The non-transitory computer-readable medium, according to claim 14, wherein the contextual data is at least one of: a privacy level setting, distance between the relying party and the holder, and geolocation of the relying party.

16. The non-transitory computer-readable medium, according to claim 14, wherein the role of the relying party is provided by the relying party.

17. The non-transitory computer-readable medium, according to claim 16, wherein role information provided by the relying party is provided in a verifiable format.

18. The non-transitory computer-readable medium, according to claim 14, wherein the cryptographic information includes a cryptographic key stored on the device of the holder.

19. The non-transitory computer-readable medium, according to claim 14, wherein the cryptogram includes a variable component corresponding to at least one of: time, a counter or a randomly generated nonce.

20. The non-transitory computer-readable medium, according to claim 14, wherein the cryptogram is presented to the verification service via a URL of the verification service.

21. The non-transitory computer-readable medium, according to claim 14, wherein the verification service redirects the device of the relying party to another server for the verification.

22. The non-transitory computer-readable medium, according to claim 14, wherein an intermediary service determines the verification service from a number of possible verification services.

23. The non-transitory computer-readable medium, according to claim 14, wherein an issuing authority that issued the virtualized credential filters information about the holder that is released to the relying party.

24. The non-transitory computer-readable medium, according to claim 23, wherein the information is filtered according to filtering rules stored by one of: the issuing authority or the holder.

25. The non-transitory computer-readable medium, according to claim 14, wherein:
the verified version of the subset of the credential data comprises an image of the holder; and
the executable code that causes at least some of the verified version of the subset of the credential data to be displayed on the screen of the device of the relying party causes the image of the holder to be displayed.

26. The non-transitory computer-readable medium, according to claim 17, wherein the role information is one of: digitally signed or securely derived and determined by a mutual authentication algorithm between the relying party and the holder.

27. A non-transitory computer-readable medium containing software that provides a virtualized credential of a holder, the software comprising:
executable code that receives a request for credential data associated with a given credential, the request being generated in response to an interaction between a device of the holder and the device of a relying party different from the holder;
executable code that authorizes a subset of the credential data to be displayed, wherein the subset of the credential data selected from the credential data depends on an ad hoc selection of corresponding credential data by the holder via the device of the holder for inclusion in the subset of the credential data, the ad hoc selection by the holder applicable to only the request for credential data associated with the interaction between the device of the holder and the device of the relying party;
executable code that presents the subset of the credential data to a verification service for verification;
executable code that receives a verified version of the subset of the credential data from the verification service; and
executable code that displays at least some of the verified version of the subset of the credential data on a screen of at least one of the device of the holder or the device of the relying party.

28. The method of claim 27, wherein the subset of the credential data is sent to the device of the relying party and displayed on the screen of the device of the relying party.

* * * * *